United States Patent
Hiiro et al.

(10) Patent No.: US 6,407,193 B1
(45) Date of Patent: *Jun. 18, 2002

(54) PROCESS FOR THE PREPARATION OF SILOXANE COPOLYMERS AND RESIN COMPOSITIONS CONTAINING THE SILOXANE COPOLYMERS PREPARED BY THE PROCESS

(75) Inventors: Tomoki Hiiro, Akashi; Ohshima Koji, Kakogawa; Aoyama Taizo, Takasago, all of (JP)

(73) Assignee: Kaneka Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/051,732

(22) PCT Filed: Aug. 15, 1997

(86) PCT No.: PCT/JP97/02846
§ 371 (c)(1),
(2), (4) Date: Jul. 30, 1998

(87) PCT Pub. No.: WO98/07773
PCT Pub. Date: Feb. 26, 1998

(30) Foreign Application Priority Data

Aug. 21, 1996 (JP) ................................ 8-220203
Apr. 4, 1997 (JP) .................................. 9-87000

(51) Int. Cl.[7] ............................................. C08G 77/08
(52) U.S. Cl. .......................... 528/18; 528/18; 528/25; 528/26; 528/29; 528/13; 528/14; 525/446
(58) Field of Search ................... 528/13, 14, 15, 528/17, 18, 19, 25, 26, 29; 525/446

(56) References Cited

U.S. PATENT DOCUMENTS

| | | | |
|---|---|---|---|
| 3,994,988 A | | 11/1976 | Laurin |
| 4,937,031 A | * | 6/1990 | Curry |
| 5,227,449 A | * | 7/1993 | Odell et al. |
| 5,504,177 A | | 4/1996 | King, Jr. et al. |
| 5,608,026 A | | 3/1997 | Hoover et al. |
| 5,783,651 A | * | 7/1998 | Konig et al. |
| 6,252,013 B1 | * | 6/2001 | Banach et al. |

FOREIGN PATENT DOCUMENTS

| | | |
|---|---|---|
| EP | 0522752 A | 1/1993 |
| EP | 0 626 416 A2 | 11/1994 |
| GB | 1515585 A | 11/1976 |
| JP | 51-136000 A | 11/1976 |
| JP | 2-196823 | 8/1990 |
| JP | 3-106937 | 5/1991 |
| JP | 4-91125 | 5/1992 |
| JP | 5-222173 A | 8/1993 |
| JP | 7-2999 A | 1/1995 |

OTHER PUBLICATIONS

Curry, J.E., et al., *J. Appl. Polym. Sci.*, vol. 9, pp. 295–311, 1965.

* cited by examiner

Primary Examiner—Robert Dawson
Assistant Examiner—Marc S. Zimmer
(74) Attorney, Agent, or Firm—Fish & Neave; James F. Haley, Jr.; Stanley D. Liang

(57) ABSTRACT

This invention relates to a process of producing a siloxane copolymer comprising the step of reacting at least one diol, at least one dicarbonate and at least one silicon compound as copolymerization components in the presence of an esterification or transesterification catalyst, wherein the silicon compound is represented by the general formulas (I) and (II):

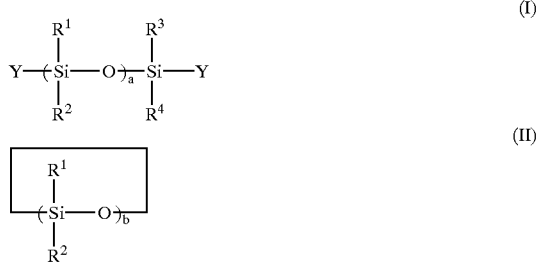

wherein $R^1$, $R^2$, $R^3$ and $R^4$ are each independently a hydrogen atom or a substituted or non-substituted organic group; X and Y are each independently a hydrogen atom or a substituted or non-substituted organic group; a represents an integer of 0 to 5,000; and b represents an integer of 3 to 20.

6 Claims, 3 Drawing Sheets

PROCESS FOR THE PREPARATION OF SILOXANE COPOLYMERS AND RESIN COMPOSITIONS CONTAINING THE SILOXANE COPOLYMERS PREPARED BY THE PROCESS

TECHNICAL FIELD

This invention relates to a new process for the preparation of siloxane copolymers and resin compositions containing the siloxane copolymers prepared by the process.

BACKGROUND ART

Thermoplastic resins are industrially useful molding materials for plastic containers, film, fiber, adhesives, extruded sheets and the like. Such thermoplastic resins (for example, polycarbonate resin whose main unit is 2,2-bis(4-hydroxyphenyl)propane (bisphenol A)) has excellent mechanical and electric properties, heat resistance, dimensional stability, transparency and moldability. However, such thermoplastic resin has disadvantages in flammability, production of a toxic gas upon burning or the like.

Since thermoplastic resins usually have high flammability, the thermoplastic resin is generally made fire-retardant by adding a fire-retardant, typically a halogen or a phosphorous compound, in the application where fire-retardance is required. However, these fire retardants are not preferred from the environmental viewpoint because they produce a more toxic gas upon burning than the thermoplastic resin itself. Moreover, there are problems in a fire retardant such as that the properties of a thermoplastic resin such as mechanical and electric properties, heat resistance, weatherability or the like may decrease dependent on the amount of it added.

As a means to improve fire retardance and moldability of thermoplastic resins, a method in which a siloxane compound is added to thermoplastic resins has been proposed. However, this method has a problem that fire retardance and moldability may not be sufficient, or the siloxane compound may bleed on the surface of a molded article of a thermoplastic resin when the compatibility of a siloxane compound with a thermoplastic resin is low.

As a means to solve the above-mentioned problems, a technique concerning to a method for producing a siloxane copolymer has been proposed. For example, in Japanese Laid-Open Publication No. 2-196823, Japanese Laid-Open Publication No. 3-106937 and Japanese Laid-Open Publication No. 7-2999, a method for producing a polyestercarbonate-siloxane copolymer by an interfacial polycondensation method using bisphenol derivatives, dicarboxylic acid dichloride, phosgene and phenol terminated dimethylpolysiloxane has been proposed. Moreover, in Japanese Laid-Open Publication No. 5-222173, a method for producing a polyestercarbonate-siloxane copolymer by an interfacial polycondensation method using phenol terminated dimethylpolysiloxane has been proposed. However, in interfacial such polycondensation methods, there are problems that phosgene and acid chloride, which are raw materials, are not easily available, and using a halogen compound such as methylene chloride is not preferred from the environmental viewpoint.

As a means to solve problems in the interfacial polycondensation method, in Japanese Laid-Open Publication No. 4-91125, a method for producing a polyester-siloxane block copolymer by a molten condensation polymerization method using dicarboxylic acid diester, diol and phenol terminated dimethylpolysiloxane has been proposed. However, in this method, because of using an expensive and special silicon compound, there are problems that the production cost is high and when the amount of siloxane unit introduced into the block copolymer increases, the physical properties (for example, mechanical strength) decrease due to a phase separation.

On the other hand, Curry et al have proposed a method for producing a siloxane copolymer to be obtained from a diol and bis(anilino)diphenylsilane (J. Appl. Polym. Sci., vol.9, pp. 295 (1965)). In this method, since the polymer produced becomes an alternating copolymer, it becomes possible to increase the introduced amount of siloxane. However, in this method, because of using an expensive and special silicon compound, the production cost becomes high and further there is a problem that it takes a long time period for the reaction. Also, there is a problem that heat-resistance of the obtained siloxane copolymer is inferior.

The purpose of this invention is to provide a method to overcome the above-mentioned problems existing in the above-mentioned conventional method for producing a siloxane copolymer and to produce a siloxane copolymer having excellent mechanical properties (for example, strength, breaking elongation and impact resistance), heat-resistance, fire-retardance, moldability (for example, mold releasing property, surface lubricating property) and transparency in more easily and more inexpensive (that is industrially and commercially advantageous). Moreover, another purpose of this invention is to provide a resin composition containing siloxane copolymer obtained by the method.

DISCLOSURE OF THE INVENTION

This invention is a process of producing a siloxane copolymer comprising the step of reacting at least one diol, at least one dicarbonate and a silicon compound in the presence of an esterification or transesterification catalyst, wherein said silicon compound is at least one compound selected from the group consisting of compounds represented by the general formulas (I) and (II):

wherein $R^1$, $R^2$, $R^3$, $R^4$, X and Y are each independently a hydrogen atom, a halogen atom, a hydroxide group, an amino group or a substituted or non-substituted organic group; a represents an integer from 0 to 5000 and b represents an integer from 3 to 20.

In a preferred embodiment, the above-mentioned diol is represented by the following general formula (III):

wherein $R^5$ is a bivalent hydrocarbon group having 1 to 20 carbon atoms wherein at least some of the hydrogen atoms in the hydrocarbon group may be substituted with at least one group selected from a halogen atom, a hydrocarbon group, an alkoxy group and a phenoxy group; or —$R^6$—

A—R⁷—, wherein R⁶ and R⁷ are each independently a bivalent aromatic hydrocarbon group having 6 to 20 carbon atoms; and A is selected from the group consisting of a single bond, —O—, —S—, —SO—, —SO₂—, —CO— and a bivalent hydrocarbon group containing 1 to 20 carbon atoms.

In a preferred embodiment, the process further comprises the step of reacting at least one diester of a dicarboxylic acid. The diester of a dicarboxylic acid is represented by the following general formula (IV):

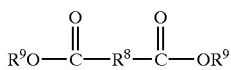

(IV)

wherein R⁸ is a bivalent hydrocarbon group having 1 to 20 carbon atoms wherein at least some of the hydrogen atoms in the hydrocarbon group may be substituted with at least one group selected from a halogen atom, a hydrocarbon group, an alkoxy group and a phenoxy group; or —R¹⁰—D—R¹¹—, and R⁹ is a hydrocarbon group having 1 to 20 carbon atoms, wherein R¹⁰ and R¹¹ are each independently a bivalent aromatic hydrocarbon group having 6 to 20 carbon atoms; and D is selected from the group consisting of a single bond, —O—, —S—, —SO—, —SO₂—, —CO— and a bivalent hydrocarbon group having 1 to 20 carbon atoms.

In a preferred embodiment, the above-mentioned dicarbonate is represented by the following general formula (V):

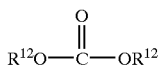

(V)

wherein R¹² represents a hydrocarbon group having 1 to 20 carbon atoms.

In a preferred embodiment, the above-mentioned silicon compound is at least one selected from the group consisting of polydimethylsiloxane, polymethylphenylsiloxane, dimethoxydimethylsilane, dimethoxydiphenylsilane, octamethylcyclotetrasiloxane and octaphenylcyclotetrasiloxane.

In a preferred embodiment, the above-mentioned diol is at least one selected from the group consisting of 2,2-bis(4-hydroxyphenyl)propane, 1,1-bis(4-hydroxyphenyl)-3,3,5-trimethylcyclohexane, bis(4-hydroxyphenyl)sulfone, 9,9-bis(4-hydroxyphenyl)fluorene.

In a preferred embodiment, the above-mentioned diester of dicarboxylic acid is at least one selected from the group consisting of diphenylterephthalate, diphenylisophthalate, dimethylterephthalate and dimethylisophthalate.

In a preferred embodiment, the above-mentioned dicarbonate is diphenylcarbonate.

In a preferred embodiment, the above-mentioned esterification or transesterification catalyst is tin compound.

In a preferred embodiment, the above-mentioned esterification or transesterification catalyst is at least one selected from the group consisting of an acetate, a carbonate, a borate, an oxide, a hydroxide, a hydride, an alcholate and a phenolate of a metal selected from the group consisting of lithium, sodium, potassium, magnesium, calcium, barium, strontium zinc, cadmium, titanium, zirconium, antimony, lead, manganese or cobalt.

In a preferred embodiment, the above-mentioned esterification or transesterification catalyst is used in the range of 0.0001 to 1.0 parts by weight based on 100 parts by weight of the siloxane copolymer obtained.

Moreover, this invention relates to a fire retardant resin composition containing the siloxane copolymer obtained by the above-mentioned process.

Moreover, this invention relates to a resin composition for molding containing the siloxane copolymer obtained by the above-mentioned process.

BEST MODE FOR CARRYING OUT THE INVENTION

Figure 1:
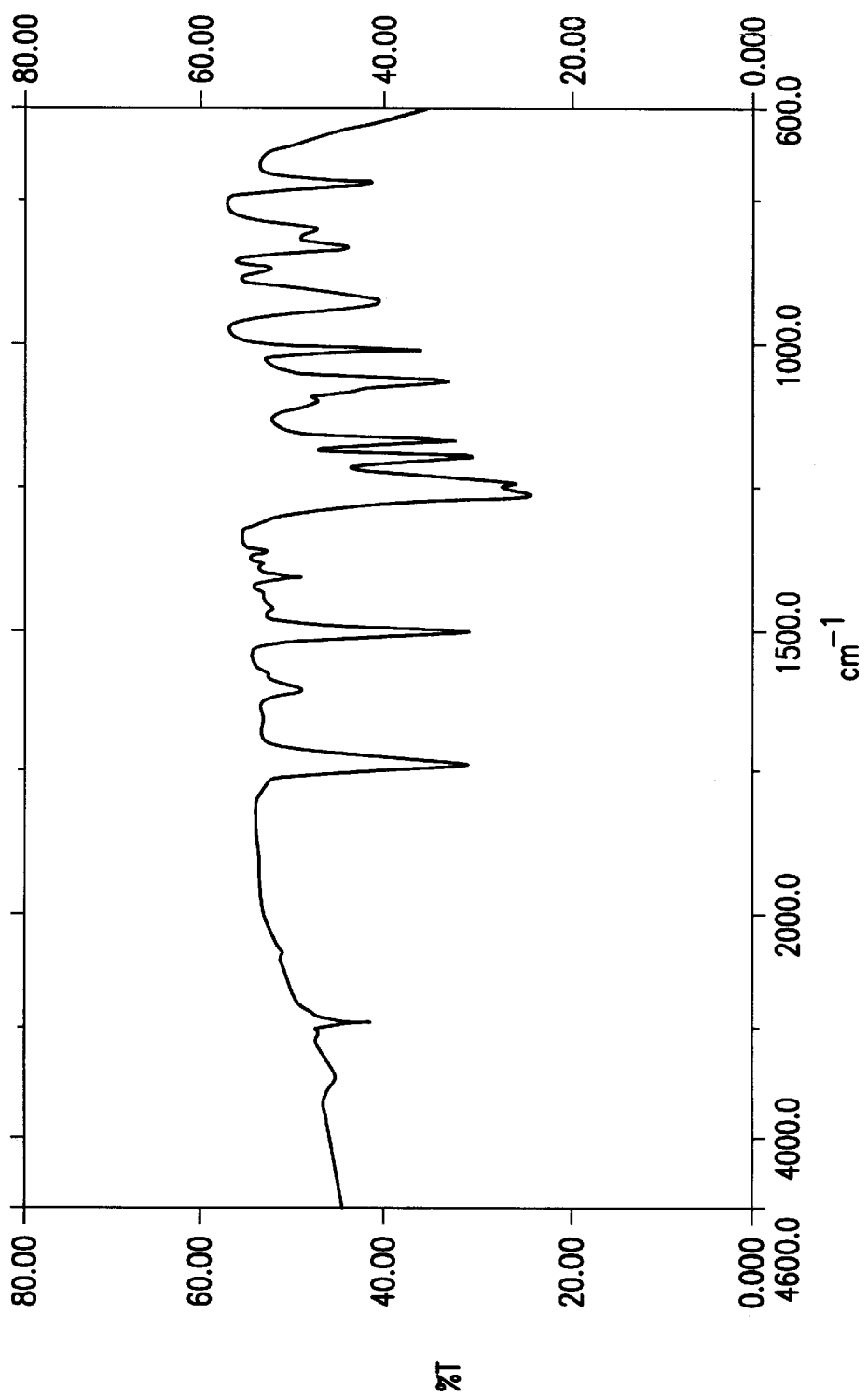
FIG. 1 is IR spectrum of the polyester-siloxane copolymer obtained by Example 1.

Hereinafter this invention is described in detail.

A process of producing a siloxane copolymer of this invention, comprises the step of reacting at least one diol, at least one dicarbonate and at least one specific silicon compound in the presence of an esterification or transesterification catalyst.

A silicon compound used in this invention is at least one selected from the compounds represented by the above-mentioned general formulas (I) and (II). In the general formulas (I) and (II), R¹, R², R³, R⁴, X and Y are each independently a hydrogen atom, a halogen atom, a hydroxide group, an amino group or a substituted or non-substituted organic group, a is an integer of 0 to 5000, preferably an integer of 0 to 100, more preferably of 0 to 50; b is an integer of 3 to 20, preferably 3 to 10, more preferably from 3 to 4. Examples of the substituted or non-substituted organic group include a hydrocarbon group, an alkoxy group, a phenoxy group, an ammonium salt-containing group, an alkylamino group, a carboxyl group, an ester group, a polyether group, an epoxy group, a vinylether group, a vinylester group, an acryl group, a methacryl group, a mercapto group and an isocyanate group. Examples of the hydrocarbon group include a linear or branched alkyl group having 1 to 20 carbon atoms, preferably 1 to 10 carbon atoms, more preferably 1 to 6 carbon atoms, and a linear or branched alkenyl group, an alkylaryl group having 6 to 20 carbon atoms, preferably 6 to 14 carbon atoms, more preferably 6 to 10 carbon atoms and cycloalkyl group. As long as not detracting from the advantage of this invention, at least some of the hydrogen atoms of the hydrocarbon group can be substituted with an arbitrary substituent. Examples of the substituent include a hydroxyl group, a halogen atom, an alkoxy group, a phenoxy group, an amino group, an ammonium salt-containing group, an alkylamino group, a carboxyl group, an ester group, a polyether group, an epoxy group, a vinyl group, a vinylether group, a vinylester group, an allyl group, an acryl group, a methacryl group, a mercapto group and an isocyanate group. Hereinafter, unless otherwise clearly indicated, the term "hydrocarbon group" includes the above-mentioned substituted or non-substituted hydrocarbon groups.

The substituted or non-substituted organic group is preferably a hydrocarbon group, an alkoxy group or a phenoxy group, more preferably a methyl group, a phenyl group, a methoxy group, an ethoxy group or a phenoxy group, most preferably a methyl group and a methoxy group. Since a silicon compound having these substituents is easily available, a simple process of producing a siloxane copolymer can be achieved.

Examples of the above-mentioned silicon compound include: alkoxysilanes such as dimethoxydimethylsilane, diethoxydimethylsilane, octadecyltrimethoxysilane, octadecyltriethoxysilane, octadecylmethyldimethoxysilane, vinylmethyldiethoxysilane, vinyltrimethoxysilane, vinyltriethoxysilane, 5-hexenyltrimethoxysilane, methylphenyldimethoxysilane, methylphenyldiethoxysilane, diphenyldimethoxysilane, diphenyldiethoxysilane, phenyltrimethoxysilane, phenyltriethoxysilane, cyclohexylmethyldimethoxysilane, N-(2-aminoethyl)-3-aminopropylmethyldimethoxysilane, 3-aminopropyltriethoxysilane, 3-chloropropylmethyldimethoxysilane, (3-glycydoxypropyl)methyldiethoxysilane, and 3-methacryloxypropylmethyldimethoxysilane, phenylsilanes such as diphenylsilane, diphenylsilanediol, cyclic siloxanes such as hexamethylcyclotrisiloxane, hexaphenylcyclotrisiloxane, octamethylcyclotetrasiloxane, octaphenylcyclotetrasiloxane, 1,3,5,7-tetramethylcyclotetrasiloxane, 1,3,5,7-tetravinyltetramethylcyclotetrasiloxane, decamethylcyclopentasiloxane, hexamethyldisiloxane, octamethyltrisiloxane, decamethyltetrasiloxane, dodecamethylpentasiloxane, tetradecamethylhexasiloxane, hexadecamethylheptasiloxane, octadecamethyloctasiloxane, eicosamethylnonasiloxane, docosamethyldecasiloxane, 3,3-diphenylhexamethyltrisiloxane, siloxane oligomers, polysiloxanes such as polydimethylsiloxane, polymethylphenylsiloxane, polydiphenylsiloxane, alkyl-modified polysiloxane, methacryl-modified polysiloxane, chloroalkyl-modified polysiloxane, fluoro-modified polysiloxane, polyether-modified polysiloxane, alchol-modified polysiloxane, amino-modified polysiloxane, epoxy-modified polysiloxane, phenol-modified polysiloxane, carboxy-modified polysiloxane and mercapto-modified polysiloxane. These silicon compounds can be used alone or in combination thereof.

Among these silicon compounds, polydimethylsiloxane, polymethylphenylsiloxane, dimethoxydimethylsilane, dimethyoxydiphenylsilane, octamethylcyclotetrasiloxane and octaphenylcyclotetrasiloxane is preferred because the raw materials thereof are easily available. Polydimethylsiloxane, dimethoxydimethylsilane and octamethylcyclotetrasiloxane is especially preferred.

The diol used for the process of this invention is preferably represented by the above-mentioned general formula (III).

In the general formula (III), $R^5$ is a bivalent hydrocarbon group having 1 to 20 carbon atoms wherein at least some of the hydrogen atoms in the hydrocarbon group may be substituted with at least one substituent selected from the group consisting of a halogen atom, a hydrocarbon group, an alkoxy group and a phenoxy group; or $—R^6—A—R^7—$, $R^6$ and $R^7$ are each independently a bivalent aromatic hydrocarbon group having 6 to 20 carbon atoms, more preferably 6 to 14 carbon atoms, most preferably 6 to 10 carbon atoms; and A is selected from the group consisting of a single bond, —O—, —S—, —SO—, —SO$_2$—, —CO—, and a bivalent hydrocarbon group having 1 to 20 carbon atoms. Preferably A is a single bond, —O—, —SO$_2$— or a bivalent hydrocarbon group having 1 to 20 carbon atoms, more preferably —SO$_2$— or a bivalent hydrocarbon group having 1 to 14 carbon atoms.

Examples of the above-mentioned diol include: aromatic diols such as 2,2-bis(4-hydroxyphenyl)propane (bisphenol A), bis(4-hydroxyphenyl)methane, bis(4-hydroxy-3,5-dimethylphenyl)methane, bis(4-hydroxy-3,5-dichlorophenyl)methane, 1,1-bis(4-hydroxyphenyl) cyclohexylmethane, 1,1-bis(4-hydroxyphenyl)ethane, 1,1-bis(4-hydroxyphenyl)-1-phenylethane, 1,1-bis(4-hydroxyphenyl)-3,3,5-trimethylcyclohexane (bisphenol TMC), 4,4'-dihydroxydiphenylether, bis(4-hydroxy-3,5-dimethylphenyl)ether, bis(4-hydroxyphenyl)sulfone, bis(4-hydroxy-3,5-dimethylphenyl)sulfone, 4,4'-dihydroxybenzophenone, 2,2-bis(4-hydroxy-3,5-dimethylphenyl)propane, tetrabromobisphenol A, tetrachlorobisphenol A, dihydroxydiphenyl, hydroquinone, resorcinol, dihydroxynaphthalene, dihydroxyanthracene, phenolphthalein, fluorescein, 2,2'-dihydroxy-1,1'-dinaphthylmethane, 4,4'-dihydroxydinaphthyl, 9,9-bis(4-hydroxyphenyl)fluorene and aliphatic diols such as ethylene glycol, propylene glycol, tetramethylene glycol, diethylene glycol, triethylene glycol, polyethylene glycol, 1,3-propanediol, 1,2-propanediol, 1,4-butanediol, 1,3-butanediol, 1,2-butanediol, 1,6-hexanediol and 1,10-decanediol. These diols can be used alone or in combinations thereof.

Among these diol, bisphenol A, bisphenol TMC, bis(4-hydroxyphenyl)sulfone and 9,9-bis(4-hydroxyphenyl) fluorene are preferred, because the copolymer obtained has excellent properties (for example, heat-resistance, mechanical property, fire retardance) and raw materials thereof are easily available. Bisphenol A is especially preferred. When using bis(4-hydroxyphenyl)sulfone or 9,9-bis(4-hydroxyphenyl)fluorene, a copolymer having excellent fire retardance can be obtained.

The process of this invention further comprises the step of reacting at least one diester of a dicarboxylic acid as a copolymerization component. This diester of a dicarboxylic acid is preferably represented by the above-mentioned general formula (IV). In the general formula (IV), $R^8$ is a bivalent hydrocarbon group having 1 to 20 carbon atoms wherein at least some of the hydrogen atoms in the hydrocarbon group may be substituted with at least one substituent group selected from the group consisting of a halogen atom, a hydrocarbon group, an alkoxy group and a phenoxy group or $—R^{10}—D—R^{11}—$; and $R^9$ is a hydrocarbon group having 1 to 20 carbon atoms, preferably 1 to 10, more preferably 1 to 6. $R^{10}$ and $R^{11}$ are independently a bivalent aromatic hydrocarbon group having 6 to 20, preferably 6 to 14, more preferably 6 to 10 carbon atoms; and D is selected from the group consisting of a single bond, —O—, —S—, —SO—, —SO$_2$—, —CO— and a bivalent hydrocarbon group having 1 to 20 carbon atoms. Preferably, D is a single bond, —O—, —SO$_2$— or a bivalent hydrocarbon group having 1 to 20 carbon atoms, more preferably —SO$_2$— or a bivalent hydrocarbon group having 1 to 14 carbon atoms.

Examples of the above-mentioned diester of a dicarboxylic acid include: dimethyl, diethyl, dipropyl, dibutyl, dicyclohexyl and diphenylesters of an aromatic dicarboxylic acid such as terephthalic acid, methoxyterephthalic acid, ethoxyterephthalic acid, fluoroterephthalic acid, chloroterephthalic acid, methylterephthalic acid, isophthalic acid, phthalic acid, methoxyisophthalic acid, methylisophthalic acid, diphenylmethane-4,4'-dicarboxylic acid, diphenylmethane-3,3'-dicarboxylic acid, diphenylether-4,4'-dicarboxylic acid, diphenyl-4,4'-dicarboxylic acid, naphthalene-1,4-dicarboxylic acid, naphthalene-1,5-dicarboxylic acid, naphthalene-2,6-dicarboxylic acid and the like, an aliphatic dicarboxylic acid such as oxalic acid, malonic acid, succinic acid, glutaric acid, adipic acid, suberic acid, azelaic acid, sebacic acid, dodecanedicarboxylic acid, 3-methylazelaic acid and the like, an alicyclic dicarboxylic acid such as 1,4-cyclohexanedicarboxylic acid, 1,3- cyclohexanedicarboxylic acid, 1,2-cyclohexanedicarboxylic acid, 1,3-cyclopentanedicarboxylic acid, 1,5-decahydronaphthalenedicarboxylic acid, 2,6-decahydronaphthalenedicarboxylic acid, 2,7-decahydronaphthalenedicarboxylic acid and the like. These diester of dicarboxylic acid can be used alone or in combination thereof.

Among these diesters of dicarboxylic acid, diphenylterephthalate, diphenylisophthalate, dimethylterephthalte and dimethylisophthalate are preferred and, diphenylterephthalate and diphenylisophthalate are especially preferred because reactivity thereof is high and raw materials thereof are easily available and the copolymer obtained exhibits excellent properties (for example, heat-resistance, mechanical property or fire retardance).

The dicarbonate used in the process of this invention is preferably represented by the above-mentioned general formula (V). In the general formula (V), $R^{12}$ is a hydrocarbon group having 1 to 20 carbon atoms, preferably 1 to 10, more preferably 1 to 6.

Examples of the dicarbonate include dimethylcarbonate, diethylcarbonate, dipropylcarbonate and diphenylcarbonate. Among the above-mentioned dicarbonates, dipheylcarbonate is especially preferred because of its high reactivity and availability.

Examples of the combination of above-mentioned starting materials used in the process of this invention include a combination of diol/silicon compound/dicarbonate. The range of molar ratio of the combination is preferably 1/0.4~2/0.4~2, more preferably 1/0.5~1/0.5~1. Especially preferred combinations include 1/0.5/1 and 1/0.5/0.5. In the case of such combination, a polycarbonate-siloxane copolymer is produced.

Particular examples of the combination include:

Bisphenol A and dimethoxymethylsilane and diphenylcarbonate (molar ratio: 1/0.5/1 or 1/0.5/0.5);

Bisphenol A and polydimethylsiloxane and diphenylcarbonate (molar ratio: 1/0.5/1 or 1/0.5/0.5);

Bisphenol A and octamethylcyclotetrasiloxane and diphenylcarbonate (molar ratio: 1/0.5/1 or 1/0.5/0.5);

Bisphenol TMC and dimethoxymethylsilane and diphenylcarbonate (molar ratio: 1/0.5/1 or 1/0.5/0.5);

Bisphenol TMC and polydimethylsiloxane and diphenylcarbonate (molar ratio: 1/0.5/1 or 1/0.5/0.5); and Bisphenol TMC and octamethylcyclotetrasiloxane and diphenylcarbonate (molar ratio: 1/0.5/1 or 1/0.5/0.5).

Particularly, a combination of bisphenol A and dimethoxymethylsilane and diphenylcarbonate (molar ratio: 1/0.5/1 or 1/0.5/0.5), and a combination of bisphenol A and polydimethylsiloxane and diphenylcarbonate (molar ratio: 1/0.5/1 or 1/0.5/0.5) is preferred, and the combination of bisphenol A and dimethoxymethylsilane and diphenylcarbonate (molar ratio: 1/0.5/1 or 1/0.5/0.5) is especially preferred because these compounds are readily available and reactivity thereof is high and the copolymer obtained exhibits especially excellent properties (for example, heat-resistance, mechanical property and fire retardance).

Moreover, in the process of this invention, when optionally using a diester of dicarboxylic acid as a starting material, examples of combinations of starting materials are as follows:

Diol/dicarboxylic acid diester/silicon compound/dicarbonate. The range of molar ratio of such combination is preferably 1/0.5~2/0.5~2/0.1~2, more preferably 1/0.5~1/0.5~1/0.5~1. Particularly preferred combinations include 1/1/1/1 and 1/0.5/0.5/0.5. In the case of such combinations, a polyester-siloxane copolymer is produced.

Also preferred range of molar ratio of the combinations of diol/dicarboxylic acid diester/silicon compound/dicarbonate is 1/0.1~0.45/0.1~0.45/1, more preferably 1/0.2~0.45/0.2~0.45/0.5~1. Particularly preferred combinations include 1/0.4/0.4/1 and 1/0.4/0.4/0.5. In the case of such combinations, a polyestercarbonate-siloxane copolymer is produced.

Specific examples of the combination include:

Bisphenol A, diphenylterephthalate, diphenylisophthalate, dimethoxydimethylsilane and diphenylcarbonate (molar ratio: 1/0.5/0.5/1/1, 1/0.25/0.25/0.5/0.5, 1/0.2/0.2/0.4/1 or 1/0.2/0.2/0.4/0.5);

Bisphenol A, diphenylisophthalate, dimethoxydimethylsilane and diphenylcarbonate (molar ratio: 1/1/1/1, 1/0.5/0.5/0.5, 1/0.4/0.4/1 or 1/0.4/0.4/0.5);

Bisphenol A, diphenylterephthalate, dimethoxydimethylsilane and diphenylcarbonate (molar ratio: 1/1/1/1, 1/0.5/0.5/0.5, 1/0.4/0.4/1 or 1/0.4/0.4/0.5);

Bisphenol A, diphenylterephthalate, diphenylisophthalate, polydimethylsiloxane and diphenylcarbonate (molar ratio: 1/0.5/0.5/1/1, 1/0.25/0.25/0.5/0.5, 1/0.2/0.2/0.4/1 or 1/0.2/0.2/0.4/0.5);

Bisphenol A, diphenylisophthalate, polydimethylsiloxane and diphenylcarbonate (molar ratio: 1/1/1/1, 1/0.5/0.5/0.5, 1/0.4/0.4/1 or 1/0.4/0.4/0.5);

Bisphenol A, diphenylterephthalate, polydimethylsiloxane and diphenylcarbonate (molar ratio: 1/1/1/1, 1/0.5/0.5/0.5, 1/0.4/0.4/1 or 1/0.4/0.4/0.5);

Bisphenol A, diphenylterephthalate, diphenylisophthalate, octamethylcyclotetrasiloxane and diphenylcarbonate (molar ratio: 1/0.5/0.5/1/1, 1/0.25/0.25/0.5/0.5, 1/0.2/0.2/0.4/1 or 1/0.2/0.2/0.4/0.5);

Bisphenol A, diphenylisophthalate, octamethylcyclotetrasiloxane and diphenylcarbonate (molar ratio: 1/1/1/1, 1/0.5/0.5/0.5, 1/0.4/0.4/1 or 1/0.4/0.4/0.5);

Bisphenol A, diphenylterephthalate, octamethylcyclotetrasiloxane and diphenylcarbonate (molar ratio: 1/1/1/1, 1/0.5/0.5/0.5, 1/0.4/0.4/1 or 1/0.4/0.4/0.5);

Bisphenol TMC, diphenylterephthalate, diphenylisophthalate, dimethoxydimethylsilane and diphenylcarbonate (molar ratio: 1/0.5/0.5/1/1, 1/0.25/0.25/0.5/0.5, 1/0.2/0.2/0.4/1 or 1/0.2/0.2/0.4/0.5);

Bisphenol TMC, diphenylisophthalate, dimethoxydimethylsilane and diphenylcarbonate (molar ratio: 1/1/1/1, 1/0.5/0.5/0.5, 1/0.4/0.4/1 or 1/0.4/0.4/0.5);

Bisphenol TMC, diphenylterephthalate, dimethoxydimethylsilane and diphenylcarbonate (molar ratio: 1/1/1/1, 1/0.5/0.5/0.5, 1/0.4/0.4/1 or 1/0.4/0.4/0.5);

Bisphenol TMC, diphenylterephthalate, diphenylisophthalate, polydimethylsiloxane and diphenylcarbonate (molar ratio: 1/0.5/0.5/1/1, 1/0.25/0.25/0.5/0.5, 1/0.2/0.2/0.4/1 or 1/0.2/0.2/0.4/0.5);

Bisphenol TMC, diphenylisophthalate, polydimethylsiloxane and diphenylcarbonate (molar ratio: 1/1/1/1, 1/0.5/0.5/0.5, 1/0.4/0.4/1 or 1/0.4/0.4/0.5);

Bisphenol TMC, diphenylterephthalate, polydimethylsiloxane and diphenylcarbonate (molar ratio: 1/1/1/1, 1/0.5/0.5/0.5, 1/0.4/0.4/1 or 1/0.4/0.4/0.5);

Bisphenol TMC, diphenylterephthalate, diphenylisophthalate, octamethylcyclotetrasiloxane and diphenylcarbonate (molar ratio: 1/0.5/0.5/1/1, 1/0.25/0.25/0.5/0.5, 1/0.2/0.2/0.4/1 or 1/0.2/0.2/0.4/0.5);

Bisphenol TMC, diphenylisophthalate, octamethylcyclotetrasiloxane and diphenylcarbonate (molar ratio: 1/1/1/1, 1/0.5/0.5/0.5, 1/0.4/0.4/1 or 1/0.4/0.4/0.5); and Bisphenol TMC, diphenylterephthalate, octamethylcyclotetrasiloxane and diphenylcarbonate (molar ratio: 1/1/1/1, 1/0.5/0.5/0.5, 1/0.4/0.4/1 or 1/0.4/0.4/0.5).

The above-mentioned combinations are particularly preferred due to the ready availability and high reactivity of each starting material and properties of the copolymer obtained (for example, heat-resistance, mechanical property and fire retardance). Particularly the combinations of bisphenol A, diphenylterephthalate, diphenylisophthalate, dimethoxydimethylsilane and diphenylcarbonate (molar ratio: 1/0.5/0.5/1/1, 1/0.25/0.25/0.5/0.5, 1/0.2/0.2/0.4/1 or 1/0.2/0.2/0.4/0.5); bisphenol A, diphenylisophthalate, dimethoxydimethylsilane and diphenylcarbonate (molar ratio: 1/1/1/1, 1/0.5/0.5/0.5, 1/0.4/0.4/1 or 1/0.4/0.4/0.5); bisphenol A, diphenylterephthalate, dimethoxydimethylsilane and diphenylcarbonate (molar ratio: 1/1/1/1, 1/0.5/0.5/0.5, 1/0.4/0.4/1 or 1/0.4/0.4/0.5) are preferred. The combinations of Bisphenol A, diphenylterephthalate, dimethoxydimethylsilane and diphenylcarbonate (molar ratio: 1/1/1/1, 1/0.5/0.5/0.5, 1/0.4/0.4/1 or 1/0.4/0.4/0.5), and bisphenol A, diphenylterephthalate, diphenylisophthalate, dimethoxydimethylsilane and diphenylcarbonate (molar ratio: 1/0.5/0.5/1/1, 1/0.2/0.2/0.4/1, 1/0.25/0.25/0.5/0.5 or 1/0.2/0.2/0.4/0.5) are especially preferred.

As a catalyst for the process of this invention, the known esterification or transesterification catalysts can be used. Examples of these catalysts include an acetate, a carbonate, a borate, an oxide, a hydroxide, a hydride, an alcholate and a phenolate of an alkali metal such as lithium, sodium, potassium, an alkali-earth metal such as magnesium, calcium, barium, strontium, transition metal such as zinc, cadmium, titanium, zirconium, tin, antimony, lead, manganese, cobalt. These esterification or transesterification catalysts can be used alone or in combination thereof.

Among these catalysts, in view of the balance between the reactivity of the above-mentioned esterification or transesterification catalyst and the properties of the copolymer obtained (for example, heat-resistance, mechanical property, hue), tin compounds are especially preferred. Examples of the tin compounds include acyltin, tetraacyl stannate, dibutyltin oxide, dibutyltin diacetate, dibutyltin laurate, dimethyltin maleate, tin dioctanoate, tin tetraacetate, stannous chloride, stannic chloride, stannous acetate, trichlorobutyltin, dichlorodibutyltin, stannous oxide and stannic oxide.

The amount of these catalysts is not particularly limited, but is preferably in the range of 0.0001 parts by weight to 1.0 parts by weight, more preferably in the range of 0.0005 parts by weight to 0.1 parts by weight based on 100 parts by weight of the siloxane copolymer obtained. When the amount of the catalyst is less than 0.0001 parts by weight, the reaction is not completed, while when it is more than 1.0 parts by weight, coloration of the polymer produced becomes intense and properties such as hydrolysis-resistance become inadequate.

In the process of this invention, use of a two step reaction at different temperatures is preferred. The first reaction step may be carried out under atmospheric pressure at preferably 80° C. to 250° C., more preferably 120° C. to 230° C. The following second reaction step may be carried out under reduced pressure (preferably from 6 Pa to 133 Pa, more preferably 6 Pa to 66 Pa) at preferably 200° C. to 400° C., more preferably 230° C. to 320° C. By use of such two step reactions at different temperatures, the siloxane copolymer of desired molecular weight can be obtained at a high yield. This is because the removal of the unreacted monomers may be obtained by performing the first step reaction under atmospheric pressure. However, this invention is not limited to the above-mentioned two step reaction, the invention may be carried out at multi-step including various temperatures and pressures or at the same temperature and pressure.

When the two step reaction is included in the process of this invention, a transesterification reaction of diol, dicarbonate and silicon compound (or silicon compound and diester of dicarboxylic acid) occurs to form a siloxane oligomer in the first step. Next, in the second step, by placing the reaction system under reduced pressure, the transesterification reaction proceeds further to form a siloxane copolymer with high molecular weight.

In the process of this invention, by adjusting the reaction conditions and the amounts of each reaction component appropriately, a variety of siloxane copolymers can be produced. In the process of this invention, when a diester of dicarboxylic acid is used as an additional starting material and a ratio of more than 1 mol of the sum of the diester of dicarboxylic acid and the silicon compound to 1 mol of diol is used, the carbonate moiety which appears to be produced by a reaction of diol with dicarbonate may be reacted completely and disappears during the polymerization, thereby forming a polyester-siloxane copolymer. In contrast, when a ratio of less than 1 mol of the sum of the diester of dicarboxylic acid and the silicon compound to 1 mol of diol is used, the carbonate moiety may not be completely reacted during the polymerization and remains, thereby forming a polyestercarbonate-siloxane copolymer. Also, when not using the diester of dicarboxylic acid, a polycarbonate-siloxane copolymer can be obtained.

In this invention, an appropriate auxiliary solvent such as diphenylether, biphenyl, substituted cyclohexane, decahydronaphthalene, 1,2,4,5-tetramethylbenzene, or a material with which the polymer produced is incompatible (for example, poly(fluorinated alkyleneoxide)) can be used. In the process of this invention, a random copolymer can be obtained.

The siloxane copolymer obtained by the process of this invention can be molded after being pelletized (or being chipped) or directly molded in a desired shape using an extruder.

The siloxane copolymer obtained by the process of this invention can be blended with the known other resins, or additives can be added to the copolymer if necessary. Examples of the above-mentioned other known resins include a thermoplastic resin such as polyethylene, polypropylene, polystyrene, polymethylmethacrylate, polyamide, polycarbonate, polyester, polyphenyleneoxide, polysulfone, a thermosetting resin such as phenol resin, epoxy resin, an elastomer such as isoprene rubber, butadiene rubber, acryl rubber. Examples of the above-mentioned additives include stabilizer, pigment, dye, fluorescent brightening agent, nucleous agent, polymerization accelerator, filler and reinforcing material (for example, glass fiber, carbon fiber). By using the present siloxane copolymer in combination with other resins and/or additives, a resin composition which can provide an article having desired properties (for example, transparency, mechanical and electrical properties, heat-resistance, weatherability) depending on the purpose can be obtained.

The siloxane copolymer obtained by the process of this invention can be used as a main component of fire retardant resin composition or as a fire retardant to improve fire retardance of known other resins (for example, a fire retardant of a resin composition for molding). The term "main component" as used in this specification means major contained component in the composition.

When the siloxane copolymer obtained by the process of this invention is used as the main component of fire retardant resin composition (when at least 30% by weight, preferably at least 50% by weight of the siloxane copolymer of this invention is contained in the composition), the weight average molecular weight is preferably 10,000 to 300,000, more preferably 20,000 to 100,000, most preferably 40,000 to 80,000. When the weight average molecular weight is less than 10,000, the mechanical properties of the article obtained are often inadequate. When it exceeds 300,000, the moldability of the resin composition is often inadequate. On the other hand, when the siloxane copolymer obtained by the process of this invention is used as a fire retardant for a resin composition (when the siloxane copolymer of this invention is contained in the composition in the range of 1.0% by weight to 30% by weight, more preferably 10% by weight to 20% by weight), its weight average molecular weight is preferably from 2,000 to 100,000, more preferably from 2,000 to 60,000, most preferably 5,000 to 40,000. When the weight average molecular weight is less than 2,000, the mechanical properties of the article obtained are often inadequate. When it exceeds 100,000, the moldability of the composition is often inadequate.

Molecular weight of the siloxane copolymer obtained by the process of this invention can be adjusted by a method which is known to the ordinary skilled person, such as by adjusting the amounts of a catalyst to be added.

The siloxane copolymer obtained by the process of this invention has excellent fire retardance, transparency and moldability (for example, mold releasing property and surface lubricating property). Thus, the siloxane copolymer obtained by the process of this invention retains the advantages of the conventional siloxane copolymer and has better fire retardance than that of the conventional siloxane copolymer.

The siloxane copolymer obtained by the process of this invention can be widely used to produce molded articles, fiber, filament, film and the like. Moreover, since the siloxane copolymer obtained by the process of this invention has excellent fire retardance, transparency and moldability (for example, mold releasing property and surface lubricating property), a resin composition for molding having excellent fire retardance, transparency, and moldability (for example, mold releasing property and surface lubricating property) as well as required properties depending on the purpose can be obtained by blending this copolymer with other arbitrary resins having required properties. Such resin composition for molding can be especially suitably used for articles to be required high heat-resistance, stiffness, hydrolysis resistance, creep resistance and the like (for example, in the field of electricity, illumination and automobiles).

Hereinafter, the effects of the invention are described.

The process of producing a siloxane copolymer of this invention comprises the step of reacting at least one diol, a diester of dicarboxylic acid if necessary, at least one dicarbonate and a specific silicon compound in the presence of an esterification or transesterification catalyst. By combining these specific starting materials, a siloxane copolymer having excellent fire retardance, transparency and moldability (for example, mold releasing property and surface lubricating property) can be obtained. Moreover, these starting materials are readily available and highly reactive. Accordingly, by combining these specific starting materials, a siloxane copolymer having the above-mentioned excellent properties can be produced easily and inexpensively. As mentioned above, the process of this invention has extremely excellent advantages industrially and commercially.

EXAMPLES

The present invention will be described below by way of illustrative examples, however, this invention is not limited to the following examples. Various other modifications can be made without departing from the scope and spirit of this invention.

The characteristics of the polymer were measured according to the following method.

(1) weight average molecular weight (Mw) of the polymer

Mw was measured by a gel-permeation chromatography (GPC) method using a 510 type GPC system (Waters Co.) with chloroform as a moving phase at a polymer concentration of 2 mg/ml and a column temperature of 35° C. Mw was calculated using polystyrene as a standard sample.

(2) glass transition temperature (Tg/° C.) of the polymer

Tg was measured by a differential scanning thermal analysis with DSC-7 (Perkin-Elmer Co.) under nitrogen atmosphere at a rate of temperature increase of 20° C./min.

(3) silicon atom content (Si/% by weight) in the polymer

After a heat treatment of the polymer with sulfuric acid, sodium carbonate and calcium carbonate were added. Then the polymer was heat treated in an electric furnace, silicon atom content in the polymer was measured by ICP (Inductively Coupled Plasma) emission spectrometer analysis.

(4) melt viscosity (Mv/poise) of the polymer

Measurement was carried out by using capilograph PD-C (TOYO SEIKI SEISAKUSYO Co. Ltd.) at 300° C. and shear rate of 1216 sec$^{-1}$.

(5) fire retardance of the polymer

After drying the pelletized polymer under a reduced pressure for 15 hours at 120° C., a sample of ⅛ inch thickness was prepared by injection molding and evaluated according to UL-94V standard.

(6) transparency (T/%) of the polymer

By using NDH-Σ 80 (NIHON DENSYOKU KOGYO), all ray permeability of a sample of ⅛ inch thickness made by injection molding was measured.

Example 1

1140 g (5.0 mol) of bisphenol A (Shinnittetsu Chemistry Co. Ltd.), 1590 g (5.0 mol) of diphenylterephthalate, 1070 g (5.0 mol) of diphenylcarbonate (TOKYO KASEI CHEMICAL INDUSTRY Co. Ltd.), 600 g (5.0 mol) of dimethoxy-dimethylsilane (TOKYO KASEI CHEMICAL INDUSTRY Co. Ltd.), 585 mg (1.7 mmol) of dibutyltin diacetate were charged into a 14 L reaction vessel equipped with a stirrer, an inlet for introducing nitrogen, a condenser and a distillation outlet. Degassing (60 Pa) and nitrogen purges with an ultra high purity nitrogen was repeated three times then, under an ultra high purity nitrogen atmosphere, heating was started. After stirring for 30 minutes at an inner temperature of 180° C. under an atmospheric pressure, the inner temperature was raised to 210° C. and stirred for 30 minutes. Next, the inner temperature was raised to 270° C. over 60 minutes during which time by-products were distilled off from the distillation outlet of the reaction vessel. The pressure of the reaction system was reduced to 133 Pa over 30 minutes, and then, held for 2 hours. After stopping stirring, the pressure of the reaction system was raised to atmospheric pressure by introducing nitrogen, and the polymer obtained was taken out of the reaction vessel. Next, this polymer was dissolved in methylene chloride and purified by re-precipitating the polymer by means of pouring the solution into a mass volume of hexane.

IR spectrum of the polymer obtained is shown in FIG. 1. As shown in FIG. 1, an absorption at 1740 cm$^{-1}$ attributable to a carbonyl (C=O) stretching vibration originated from the ester bond was confirmed in the polymer obtained. Moreover, in the polymer obtained, an absorption at the range of 910 cm$^{-1}$ to 940 cm$^{-1}$ attributable to an Si—O stretching vibration originated from the O—Si—R (aromatic) bond was confirmed. The silicon atom content was measured to be 4.0% by weight using ICP emission spectrometer analysis method after alkali fusion of the polymer. From the above-mentioned result, the polymer obtained was confirmed to be a polyester-siloxane copolymer.

The copolymer obtained was evaluated according to the above-mentioned methods (1)-(6). The evaluation results are shown in Table 1.

Example 2

The polymer was obtained according to Example 1 except for using 370 g (repeating unit 5.0 mol) of polydimethylsiloxane (silicone oil KF968 (Shin-etsu Chemical Industry Co. Ltd.)) instead of dimethoxydimethylsilane.

By the same analysis as Example 1, the polymer obtained was confirmed to be a polyester-siloxane copolymer.

The copolymer obtained was evaluated according to the above-mentioned methods (1)-(6). The evaluation results are shown in Table 1.

Example 3

The polymer was obtained according to Example 1 except for using 109 g (repeating unit 5.0 mol) of polymethylphenylsiloxane (silicone oil KF54 (Shin-etsu Chemical Industry Co. Ltd.)) instead of dimethoxydimethylsilane.

By the same analysis as Example 1, the polymer obtained was confirmed to be a polyester-siloxane copolymer.

The copolymer obtained was evaluated according to the above-mentioned methods (1)-(6). The evaluation results are shown in Table 1.

Example 4

The polymer was obtained according to Example 1 except for using 795 g (2.5 mol) of diphenylisophthalate and 795 g (2.5 mol) of diphenylterephthalate instead of diphenylterephthalate.

By the same analysis as Example 1, the polymer obtained was confirmed to be a polyester-siloxane copolymer.

The copolymer obtained was evaluated according to the above-mentioned methods (1)-(6). The evaluation results are shown in Table 1.

Example 5

The polymer was obtained according to Example 1 except for using 636 g (2.0 mol) of diphenylterephthalate and 240 g (2.0 mol) of dimethoxydimethylsilane.

Figure 2:
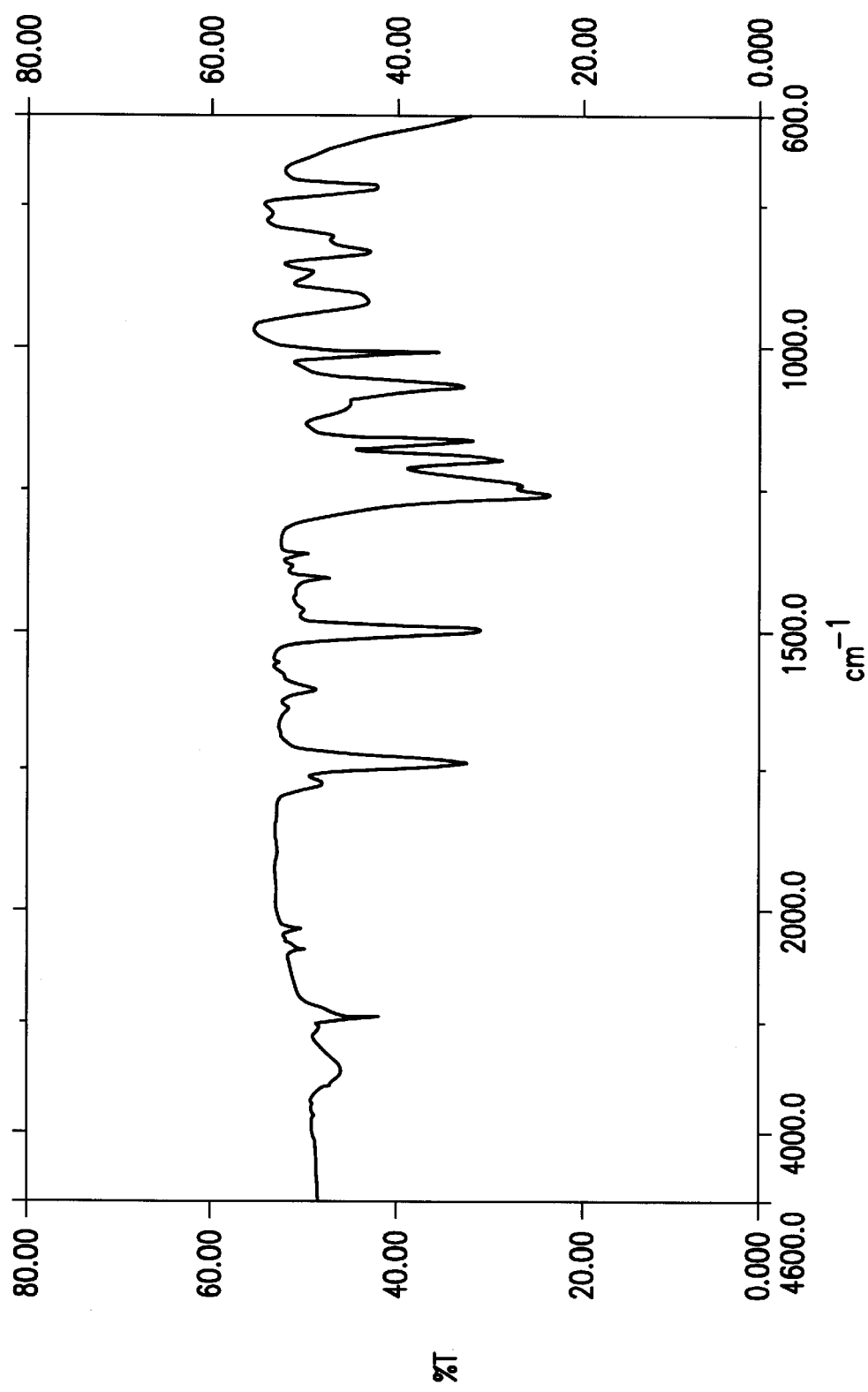
FIG. 2 is IR spectrum of the polyestercarbonate-siloxane copolymer obtained by Example 5.

The IR spectrum of the polymer obtained is shown in FIG. 2. As shown in FIG. 2, in the polymer obtained, absorptions at 1740 cm$^{-1}$ attributable to a carbonyl (C=O) stretching vibration originated from the ester bond and at 1775 cm$^{-1}$ attributable to a carbonyl (C=O) stretching vibration originated from the carbonate bond were confirmed. Moreover, in the polymer obtained, an absorption at the range of 910 cm$^{-1}$ to 940 cm$^{-1}$ attributable to an Si—O stretching vibration originated from the O—Si—R (aromatic) bond was confirmed. The silicon atom content was measured to be 2.2% by weight using ICP emission spectrometer analysis method after alkali fusion of the polymer. From the above-mentioned result, the polymer obtained was confirmed to be a polyestercarbonate-siloxane copolymer.

The copolymer obtained was evaluated according to the above-mentioned methods (1)-(6). The evaluation results are shown in Table.1.

Example 6

The polymer was obtained according to Example 1 except for using 1750 g (5.0 mol) of 9,9-bis(4-hydroxyphenyl)fluorene (Shinnittetsu Chemical Co. Ltd.,) instead of bisphenol A.

By the same analysis as Example 1, the polymer obtained was confirmed to be a polyester-siloxane copolymer.

The copolymer obtained was evaluated according to the above-mentioned methods (1), (3), (5) and (6). The evaluation results are shown in Table 1.

Example 7

The polymer was obtained according to Example 1 except for using 120 g (1.0 mol) of dimethoxydimethylsilane without using diphenylterephthalate.

Figure 3:
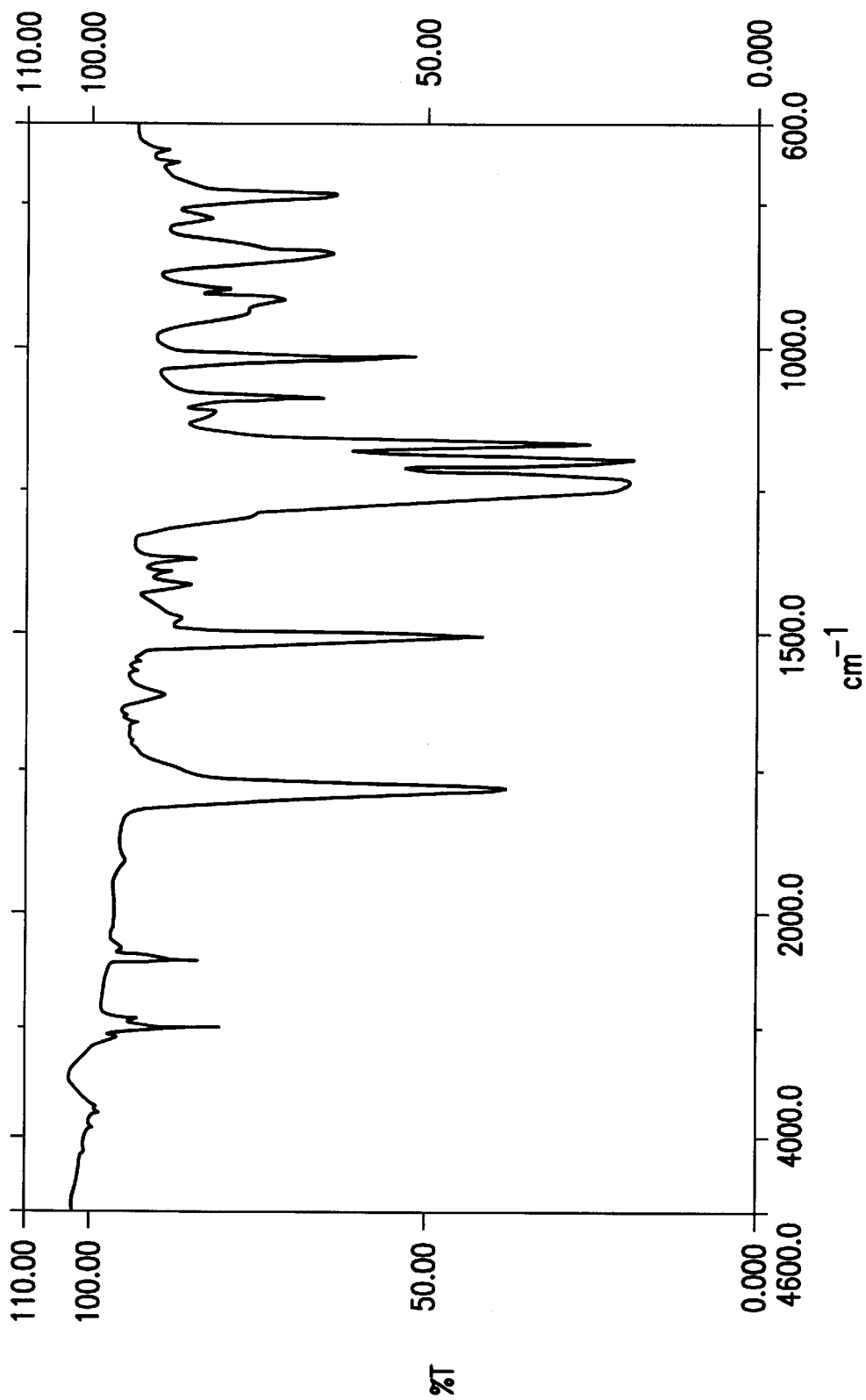
FIG. 3 is IR spectrum of the polycarbonate-siloxane copolymer obtained by Example 7.

IR spectrum of the polymer obtained is shown in FIG. 3. As shown in FIG. 3, in the polymer obtained, an absorption at the 1775 cm$^{-1}$ carbonyl (C=O) stretching vibration originated from the carbonate bond was confirmed. Moreover, in the polymer obtained, an absorption at the range of 910 cm$^{-1}$ to 940 cm$^{-1}$ attributable to an Si—O stretching vibration originated from the O—Si—R (aromatic) bond was confirmed. The silicon atom content was measured to be 2.0% by weight using ICP emission spectrometer analysis after alkali fusion of the polymer. From the above-mentioned results, the polymer obtained was confirmed to be a polycarbonate-siloxane copolymer.

The copolymer obtained was evaluated according to the above-mentioned methods (1)-(6). The evaluation results are shown in Table 1.

Example 8

The polymer was obtained according to Example 7 except for using 74 g (repeating unit 1.0 mol) of polydimethylsiloxane (Shin-etsu Chemical Industry Co. Ltd., silicone oil KF968) instead of dimethoxydimethylsilane.

By the same analysis as Example 1, the polymer obtained was confirmed to be a polycarbonate-siloxane copolymer.

The copolymer obtained was evaluated according to the above-mentioned methods (1)-(6). The evaluation results are shown in Table 1.

Example 9

The polymer was obtained according to Example 7 except for using 109 g (repeating unit 1.0 mol) of polymethylphenylsiloxane (Shin-etsu Chemical Industry Co. Ltd., silicone oil KF54) instead of dimethoxydimethylsilane.

By the same analysis as Example 1, the polymer obtained was confirmed to be a polycarbonate-siloxane copolymer.

The copolymer obtained was evaluated according to the above-mentioned methods (1)–(6). The evaluation results are shown in Table 1.

Comparative Example 1

Commercially available polycarbonate resin (TEIJIN KASEI Co., Ltd., Panlight L-1250) was evaluated according to the above-mentioned methods (1), (2) and (4)–(6). The evaluation results are shown in Table 1.

TABLE 1

|  | Mw | Si content (% by weight) | Tg (° C.) | Mv (poise) | Fire retardance | T (%) |
|---|---|---|---|---|---|---|
| Example 1 | 56,000 | 4.0 | 131 | 4,500 | V-0 | 89 |
| Example 2 | 48,000 | 3.3 | 138 | 6,000 | V-0 | 88 |
| Example 3 | 53,000 | 3.6 | 132 | 5,000 | V-0 | 90 |
| Example 4 | 45,000 | 3.9 | 129 | 3,500 | V-0 | 88 |
| Example 5 | 56,000 | 2.2 | 130 | 4,000 | V-0 | 89 |
| Example 6 | 40,000 | 3.0 | — | — | V-0 | 87 |
| Example 7 | 58,000 | 2.0 | 125 | 3,000 | V-0 | 88 |
| Example 8 | 63,000 | 1.9 | 128 | 4,000 | V-0 | 87 |
| Example 9 | 59,000 | 2.0 | 124 | 3,000 | V-0 | 90 |
| Comparative Example 1 | 62,000 | — | 147 | 8,000 | V-2 | 90 |

As shown in Table 1, the siloxane copolymer obtained by the process of this invention has the same or better transparency and moldability (for example, mold releasing property and surface lubricating property) than the polycarbonate resin. Also, it can be seen that the siloxane copolymer obtained by the process of this invention has been remarkably improved in fire retardance compared with the polycarbonate resin.

Example 10

30 parts by weight of the each polymer obtained from Examples 1 and 7 was added to 100 parts by weight of commercially available polycarbonate resin (Panlight L-1250 (TEIJIN KASEI Co. Ltd.)), and melted and kneaded by using a double screw extruder (LABOTEX (NIHON SEIKOUJYO Co. Ltd.)) to obtain pellet-like resin compositions, respectively. By injection molding of these resin compositions, ⅛ inch thick samples were prepared, and fire retardance was evaluated respectively. In the case of using polycarbonate resin only (the above-mentioned Comparative Example 1), the evaluation of fire retardance according to UL-94V standard was V-2. In contrast, the evaluation of fire retardance of the resin compositions having the siloxane copolymer obtained by Examples 1 and 7 were both V-0. The siloxane copolymer obtained by the process of this invention was also confirmed to have an excellent function as a fire retardant which gives fire retardance to known thermoplastic resins.

This invention involves a process of producing a siloxane copolymer having better fire retardance, transparency and moldability (for example, mold releasing property and surface lubricating property) than a siloxane copolymer obtained by the conventional method, and which process can be practiced more simply and less expensively. In addition, this invention also involves a resin composition containing a siloxane copolymer obtained by the process of the present invention, thereby exhibiting good fire retardance and moldability.

POSSIBLE INDUSTRIAL APPLICAPABILITY

The siloxane copolymer obtained by the process of this invention has excellent fire retardance, transparency and moldability (for example, mold releasing property and surface lubricating property). And it is especially superior in fire retardance without sacrificing the other advantageous properties. Accordingly, the siloxane copolymer obtained by the process of this invention is especially useful for articles in which high heat-resistance is required. The siloxane copolymer obtained by the process of this invention is useful as a main component of a fire retardant resin composition or a molding resin composition, and also useful as a fire retardant to improve fire retardance of other resins.

Accordingly, the siloxane copolymer obtained by the process of this invention, and the fire retardant resin composition containing said copolymer, and the molding resin composition are especially suitable for articles in the field of electricity, illumination and automobiles.

What is claimed is:

1. A process of producing a random siloxane copolymer comprising the step of reacting at least one diol, at least one dicarbonate and a silicon compound as copolymerization components in the presence of an esterification or transesterification catalyst, wherein said silicon compound is at least one selected from the group consisting of compounds represented by the general formulas (I) and (II):

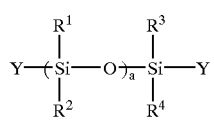

(I)

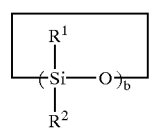

(II)

wherein $R^1$, $R^2$, $R^3$, $R^4$, X and Y are each independently a hydrogen atom, a halogen atom, a hydroxyl group, an amino group, or a substituted or non-substituted organic group; a represents an integer of 0 to 5,000; and b represents an integer of 3 to 20; further comprising the step of reacting at least one diester of a dicarboxylic acid as an additional copolymerization component, wherein said diester of a dicarboxylic acid is represented by the general formula (IV):

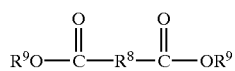

(IV)

wherein $R^8$ is a bivalent hydrocarbon group having 1 to 20 carbon atoms wherein at least some of the hydrogen atoms in the hydrocarbon group may be substituted with at least one group selected from a halogen atom, a hydrocarbon group, an alkoxy group and a phenoxy group; or —$R^{10}$—D—$R^{11}$—, and $R^9$ is a hydrocarbon group having 1 to 20 carbon atoms, wherein $R^{10}$ and $R^{11}$ are each independently a bivalent aromatic hydrocarbon group having 6 to 20 carbon atoms; and D is selected from the group consisting of a single bond, —O—, —S—, —SO—, —$SO_2$—, —CO— and a bivalent hydrocarbon group having 1 to 20 carbon atoms.

2. A process of producing a random siloxane group comprising the step of reacting at least one diol, at least one dicarbonate and a silicon compound as copolymerization components in the presence of an esterification or transesterification catalyst, wherein said silicon compound is at least one selected from the group consisting of compounds represented by the general formulas (I) and (II):

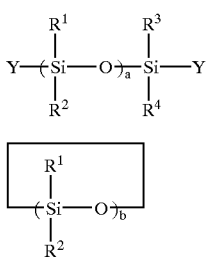

(I)

(II)

wherein $R^1$, $R^2$, $R^3$, $R^4$, X and Y are each independently a hydrogen atom, a halogen atom, a hydroxyl group, an amino group, or a substituted or non-substituted organic group; a represents an integer of 0 to 5,000; and b represents an integer of 3 to 20; and wherein said step further comprises reacting a diester of dicarboxylic acid is at least one selected from the group consisting of diphenylterephthalate, diphenylisophthalate, dimethylterephthalate and dimethylisophthalate as a copolymerization component.

3. A process of producing a random siloxane copolymer comprising the step of reacting at least one diol, at least one dicarbonate and a silicon compound as copolymerization components in the presence of an esterification and trans-esterification catalyst, wherein said silicon compound is at least one selected from the group consisting of compounds represented by the general formulas (I) and (II):

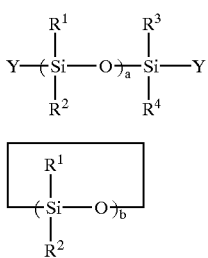

(I)

(II)

wherein $R^1$, $R^2$, $R^3$, $R^4$, X and Y are each independently a hydrogen atom, a halogen atom, a hydroxyl group, an amino group, or a substituted or non-substituted organic group; a represents an integer of 0 to 5,000; and b represents an integer of 3 to 20; and wherein said esterification or trans-esterication catalyst is a tin compound.

4. A process of producing a random siloxane copolymer comprising the step of reacting at least one diol, at least one dicarbonate, and a silicone compound as copolymerization components in the presence of an esterification or a trans-esterification catalyst, wherein said silicone compound is at least one selected from the group consisting of compounds represented by the general formulas (I) and (II):

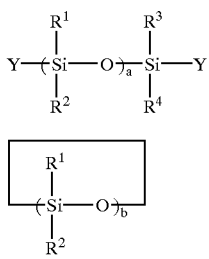

(I)

(II)

wherein $R^1$, $R^2$, $R^3$, and $R^4$ are each independently a hydrogen atom, a halogen atom, a hydroxyl group, or a substituted- or non-substituted organic group, X and Y are each independently selected from the group consisting of an alkoxy group, a phenoxy group, a non-substituted organic hydrocarbon or a substituted organic hydrocarbon wherein at least one or more hydrogen atoms may be independently replaced with one or more substituents selected from the group consisting of a hydroxyl substituent, a halogen atom, an amino substituent, an ammonium salt-containing substituent, an alkylamino substituent, a carboxyl substituent, an ester substituent, a polyether substituent, an epoxy substituent, a vinyl substituent, a vinylether substituent, a vinyl ester substituent, an allyl substituent, an acryl substituent, a methacryl substituent, a mercapto substituent, and an isocyanate substituent; a represents an integer of 0 to 5000; and b represents an integer of 3 to 20.

5. The process according to claim 4, wherein X and Y are each independently selected from the group consisting of a methyl group, a phenyl group, a methoxy group, an ethoxy group and a phenoxy group.

6. The process according to claim 5, wherein X and Y are each independently selected from the group consisting of a methyl group and a methoxy group.

* * * * *

UNITED STATES PATENT AND TRADEMARK OFFICE
CERTIFICATE OF CORRECTION

PATENT NO. : 6,407,193 B1
DATED : June 18, 2002
INVENTOR(S) : Hiiro Tomoki, Koji Ohshima and Taizo Aoyama It is certified that error appears in the above-identified patent and that said Letters Patent is hereby corrected as shown below:

<u>Title page,</u>
Item [75], change the Inventors' names from "Tomoki Hiiro, Akashi; Ohshima Koji, Kakogawa; Aoyama Taizo, Takasago, all of (JP)" to -- Tomoki Hiiro, Akashi; Koji Ohshima, Kakogawa; Taizo Aoyama, Takasago, all of (JP) --.
Item [30], change the Foreign Application Priority Data from "9-87000" to -- 9/087000 --.

Signed and Sealed this

Fifteenth Day of April, 2003

JAMES E. ROGAN
*Director of the United States Patent and Trademark Office*